(12) United States Patent
Rokosz et al.

(10) Patent No.: US 7,509,295 B2
(45) Date of Patent: Mar. 24, 2009

(54) COMPUTER IMPLEMENTED METHOD FOR ANALYZING A COLLABORATIVE SPACE

(75) Inventors: Vaughn T. Rokosz, Newton, MA (US); Andrew L. Schirmer, Andover, MA (US)

(73) Assignee: International Business Machines Corporation, Armonk, NY (US)

( * ) Notice: Subject to any disclaimer, the term of this patent is extended or adjusted under 35 U.S.C. 154(b) by 577 days.

(21) Appl. No.: 10/730,247

(22) Filed: Dec. 8, 2003

(65) Prior Publication Data
US 2005/0144228 A1    Jun. 30, 2005

(51) Int. Cl.
*G06F 17/00* (2006.01)
(52) U.S. Cl. .......................................... 706/11; 709/204
(58) Field of Classification Search .................... 706/11; 709/204
See application file for complete search history.

(56) References Cited

OTHER PUBLICATIONS http://web.archive.org/web/20021001103129/netscan.research.microsoft.com/Static/Default.asp.*
http://groups.google.com.*
"A Connectionist Approach for Evaluating the Complexity of Interaction in the World Wide Web the Case of News Groups", luigi.lancieri@cnet.francetelecom.fr, France Telecom—Centre National d'etudes des Telecommunications (CNET), 2000 IEEE.

* cited by examiner

*Primary Examiner*—David R Vincent
*Assistant Examiner*—Lut Wong
(74) *Attorney, Agent, or Firm*—Hoffman Warnick LLC; Daniel McLoughlin

(57) ABSTRACT

Under the present invention, interactivity metrics between users of collaborative spaces are measured. Based on the interactivity metrics, the collaborative spaces are categorized. Then, when a potential user provides desired interactivity metrics for a collaborative space he/she wishes to utilize, one or more of the categorized collaborative spaces can be recommend thereto.

3 Claims, 4 Drawing Sheets

FIG. 2

| COLLABORATIVE SPACE | PROBABILITY OF RESPONSE 48A | NUMBER OF DOCUMENTS 48B | AVERAGE THREAD DEPTH 48C | AVERAGE NUMBER OF RESPONSES 48D | AVERAGE TIME BETWEEN RESPONSES 48E |
|---|---|---|---|---|---|
| COLLABORATIVE SPACE A (50A) | 83% | 33 | 2.4 | 5 | 7 SECONDS |
| COLLABORATIVE SPACE B (50B) | 21% | 165 | 1.7 | 4 | 1.3 MINUTES |
| COLLABORATIVE SPACE C (50C) | 5% | 6 | 1.2 | 3 | 4 DAYS |

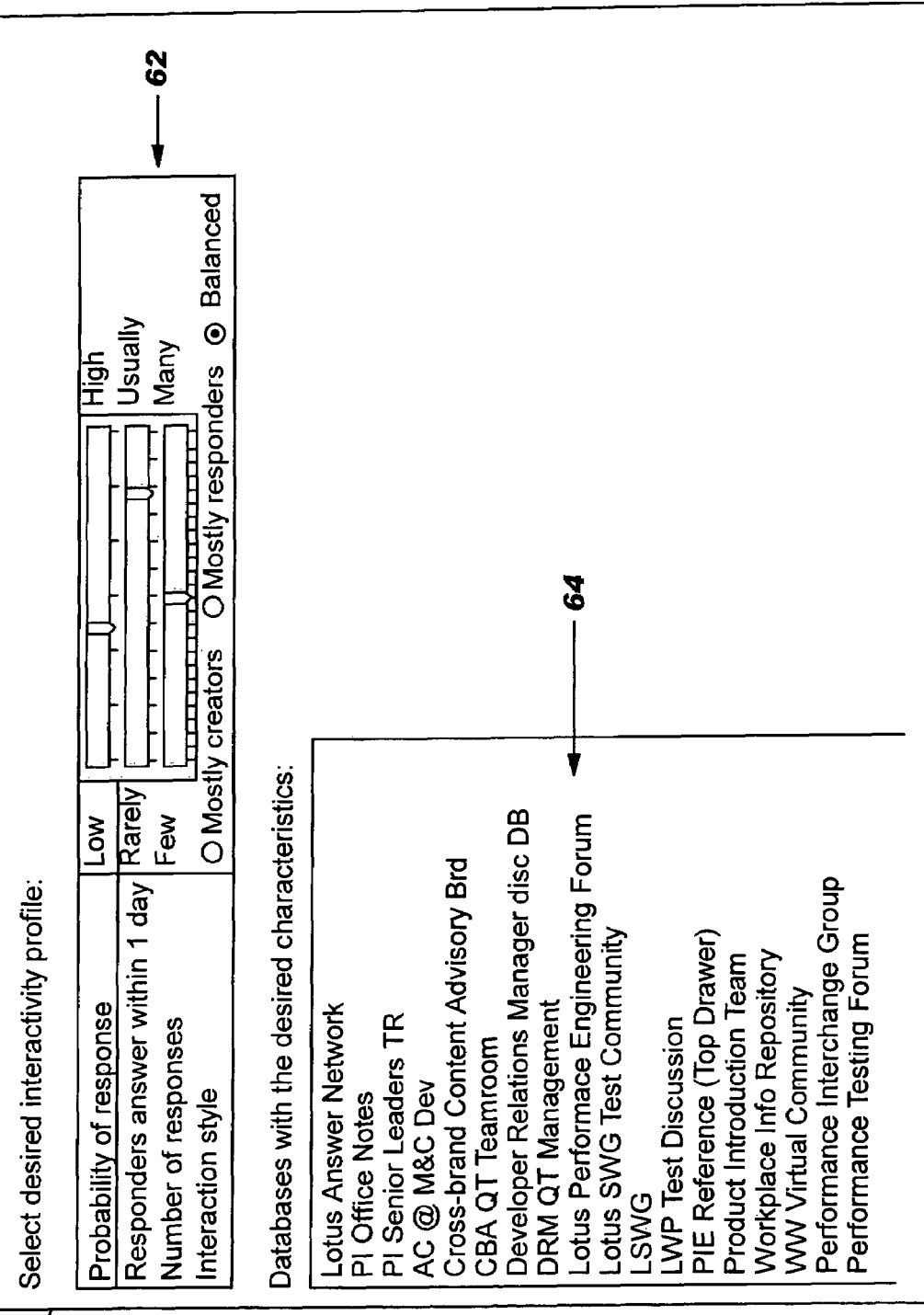

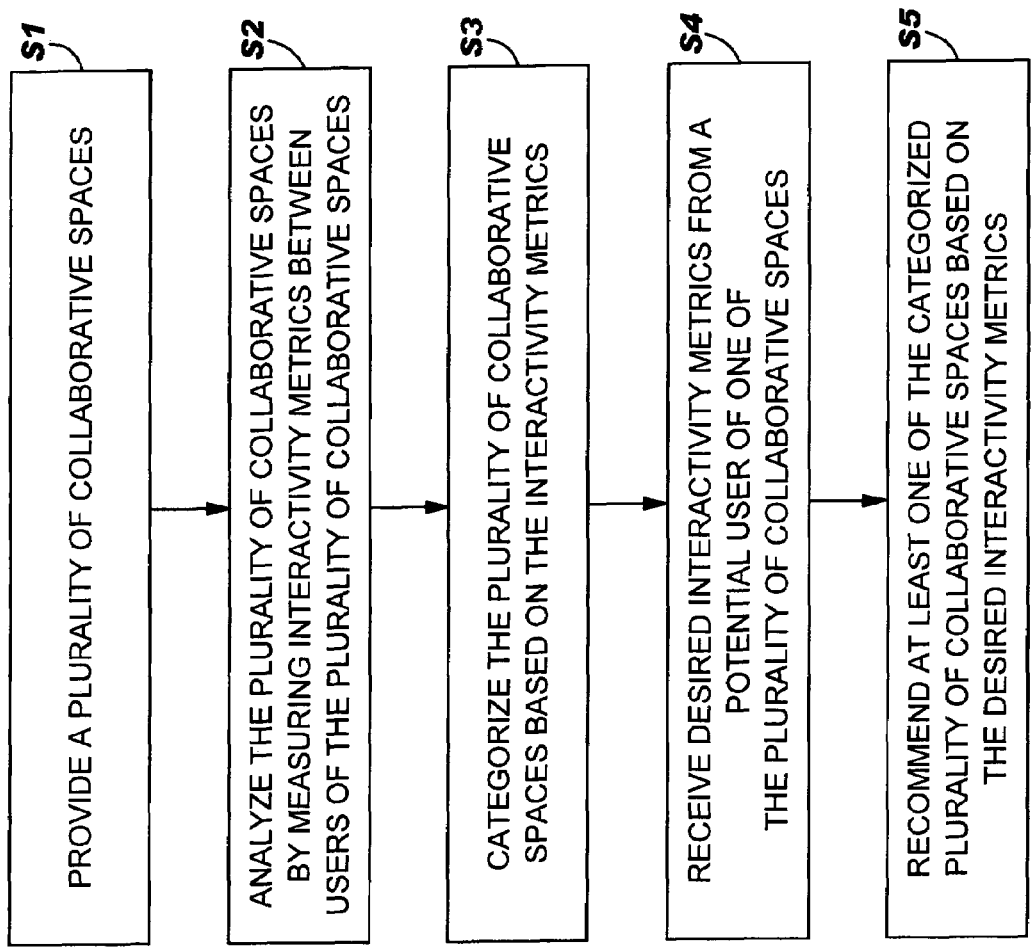

COMPUTER IMPLEMENTED METHOD FOR ANALYZING A COLLABORATIVE SPACE

BACKGROUND OF THE INVENTION

1. Field of the Invention

In general, the present invention provides a computer-implemented method, system and program product for analyzing a collaborative space. Specifically the present invention allows collaborative spaces to be categorized based on interactivity metrics between the users thereof.

2. Related Art

As the use of the Internet and other computing networks become more pervasive, an increasing number of computer users are turning to network-based collaborative spaces to collaborate on projects/tasks. Typical examples of collaborative spaces include, among others, Internet newsgroups, Internet chat rooms, instant message exchanges and electronic mail exchanges. Such spaces have become so useful and prolific, that it is not unusual to see thousands or tens of thousands of collaborative spaces (e.g., Internet newsgroups, LOTUS NOTES or QUICKPLACE databases in a large company.

The basic problem is not finding a collaborative space, but finding a collaborative space that will support the style of interaction that a user or group of users is seeking. For example, a user might have a particular question for which he/she desires to receive a quick answer. However, certain collaborative spaces visited by the user might not lend themselves to a quick answer and question. For example, an Internet newsgroup could require the user to post the question and then wait hours or days for a response to be posted.

Heretofore, attempts have been provided to aid a user in locating collaborative spaces. Unfortunately, these attempts merely locate a collaborative space based on the content of the information contained therein. For example, if a user is attempting to locate a sports-related collaborative space, the existing systems (e.g., GOOGLE news group searching, or YAHOO groups) will provide a keyword search that allows the user to locate sports-related collaborative spaces. While content-based approaches can find collaborative spaces that are relevant to a topic, these approaches do not tell how well a given collaborative space will support a user's work. For example, if the user has a question about JAVA, it would not help for him/her to post your question in a collaborative space that is only used to store JAVA reference information. Rather, the user should post the question in a place where other users respond to questions.

In view of the foregoing, there exists a need for a computer-implemented method, system and program product for analyzing a collaborative space. Specifically, a need exists whereby the nature of collaborative spaces can be analyzed by measuring interactivity metrics between the users thereof. A further need exists for the collaborative spaces to be categorized based on the interactivity metrics. Still yet, a need exists for at least one of the categorized collaborative spaces to be recommended to a potential user based on a desired need of the potential user.

SUMMARY OF THE INVENTION

In general, the present invention provides a computer-implemented method, system and program product for analyzing a collaborative space. Specifically, under the present invention, interactivity metrics between users of collaborative spaces are measured. Based on the interactivity metrics, the collaborative spaces are categorized. Then, when a potential user provides desired interactivity metrics for a collaborative space he/she wishes to utilize, one or more of the categorized collaborative spaces can be recommend thereto.

A first aspect of the present invention provides a computer-implemented method for analyzing a collaborative space, comprising: providing a collaborative space; and analyzing the collaborative space by measuring interactivity metrics between users of the collaborative space.

A second aspect of the present invention provides a computer-implemented method for analyzing collaborative spaces, comprising: providing a plurality of collaborative spaces; analyzing the plurality of collaborative spaces by measuring interactivity metrics between users of the plurality of collaborative spaces; categorizing the plurality of collaborative spaces based on the interactivity metrics; receiving desired interactivity metrics from a potential user of the plurality of collaborative spaces; and recommending at least one of the categorized plurality of collaborative spaces to the potential user based on the desired interactivity metrics.

A third aspect of the present invention provides a computerized system for analyzing a collaborative space, comprising: a metric analysis system for analyzing a plurality of collaborative spaces by measuring interactivity metrics between users of the collaborative spaces; a categorization system for categorizing the plurality of collaborative spaces based on the interactivity metrics; and a recommendation system for recommending at least one of the categorized plurality of collaborative spaces to a potential user based on desired interactivity metrics provided by the potential user.

BRIEF DESCRIPTION OF THE DRAWINGS

These and other features of this invention will be more readily understood from the following detailed description of the various aspects of the invention taken in conjunction with the accompanying drawings in which:

FIG. 2 depicts an illustrative table of interactivity metrics as populated after analysis of collaborative spaces according to the present invention.

FIG. 3 depicts an illustrative user interface for providing desired interactivity metrics according to the present invention.

FIG. 4 depicts an illustrative method flow diagram according to the present invention.

Figure 1:
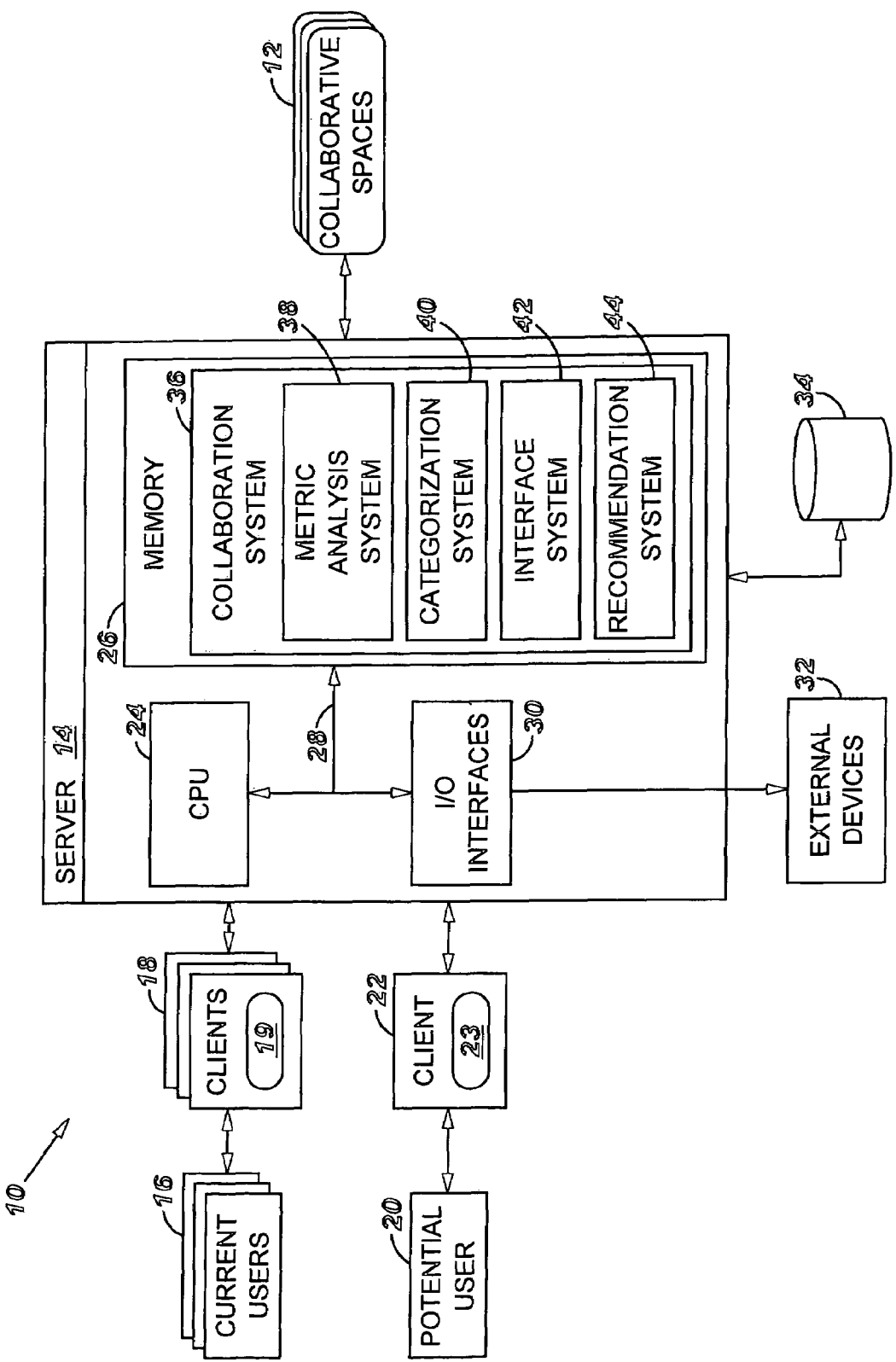
FIG. 1 depicts an illustrative system for analyzing collaborative spaces according to the present invention.

It is noted that the drawings of the invention are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, the present invention provides a computer-implemented method, system and program product for analyzing a collaborative space. Specifically, under the present invention, interactivity metrics between users of collaborative spaces are measured. Based on the interactivity metrics, the collaborative spaces are categorized. Then, when a potential user provides desired interactivity metrics for a collaborative space he/she wishes to utilize, one or more of the categorized collaborative spaces can be recommend thereto.

It should be understood that as used herein, the term "collaborative space" is intended to refer to any network based forum in which one or more users can collaborate. Examples of a collaborative space include, among others, Internet newsgroups, Internet chat rooms, instant message exchanges, electronic mail exchanges, exchange databases, document management systems, discussion forums and LOTUS NOTES databases.

In any event, referring now to FIG. 1, an illustrative system 10 for analyzing collaborative spaces 12 under the present invention is shown. In a typical embodiment, collaborative spaces 12 are made available to current users 16 and potential user 20 over a network such as over the Internet, a local area network (LAN), a wide area network (WAN), a virtual private network (VPN), etc. Accordingly, to access collaborative spaces 12, current users 16 and potential user 20 are shown communicating with server 14 via clients 18 and 22, respectively. Server 14 is intended to represent any type of system that administers or controls access to collaborative spaces 12. For example, server 14 could be a server that makes a set of Internet chat rooms available to users. Clients 18 and 22 are intended to represent any type of computerized systems that are capable of communicating with server 14. For example, clients 18 and 22 could be a personal computer, a workstation, a laptop, a hand held device, etc. To this extent, clients 18 and 22 are shown including interfaces 19 and 23 (e.g., web browsers) for working within collaborative spaces 12.

In any event, communication between clients 18 and 22 and server 14 could occur via a direct hardwired connection (e.g., serial port), or via an addressable connection that may utilize any combination of wireline and/or wireless transmission methods. The systems may utilize conventional network connectivity, such as Token Ring, Ethernet, WiFi or other conventional communications standards. Moreover, connectivity could be provided by conventional TCP/IP sockets-based protocol. In this instance, clients 18 and 22 could utilize an Internet service provider to establish connectivity to server 14.

As further shown in FIG. 1, server 14 generally comprises central processing unit (CPU) 24, memory 26, bus 28, input/output (I/O) interfaces 30, external devices/resources 32 and storage unit 34. CPU 24 may comprise a single processing unit, or be distributed across one or more processing units in one or more locations, e.g., on a client and computer system. Memory 26 may comprise any known type of data storage and/or transmission media, including magnetic media, optical media, random access memory (RAM), read-only memory (ROM), a data cache, etc. Moreover, similar to CPU 24, memory 26 may reside at a single physical location, comprising one or more types of data storage, or be distributed across a plurality of physical systems in various forms.

I/O interfaces 30 may comprise any system for exchanging information to/from an external source. External devices/resources 32 may comprise any known type of external device, including speakers, a CRT, LCD screen, handheld device, keyboard, mouse, voice recognition system, speech output system, printer, monitor/display, facsimile, pager, etc. Bus 28 provides a communication link between each of the components in server 14 and likewise may comprise any known type of transmission link, including electrical, optical, wireless, etc.

Storage unit 34 can be any system (e.g., database) capable of providing storage for information under the present invention. Such information could include, for example, measured interactivity metrics between current users 16 of collaborative spaces 12, etc. As such, storage unit 34 could include one or more storage devices, such as a magnetic disk drive or an optical disk drive. In another embodiment, storage unit 34 includes data distributed across, for example, a local area network (LAN), wide area network (WAN) or a storage area network (SAN) (not shown). Although not shown, additional components, such as cache memory, communication systems, system software, etc., may be incorporated into server 14. In addition, it should also be appreciated that although not shown, clients 18 and 22 would likely include computerized components similar to server 14. Such components have not been shown for brevity purposes.

Shown in memory 26 of server 14 is collaboration system 36, which analyzes interactivity between current users 16 of collaborative spaces 12 so that potential user 20 can locate a collaborative that best meets his/her needs. To this extent, it should be understood that collaboration system 36 could be incorporated within, or work in conjunction with any known program that provides collaborative spaces (e.g., an Internet chat program). In any event, collaboration system 36 includes metric analysis system 38, categorization system 40, interface system 42 and recommendation system 44.

Assume, for example, that potential user 20 has a particular question relating to Information Technology (IT) for which he/she wishes to rapidly obtain an answer. As indicated above, existing technology might allow potential user 20 to search for a collaborative space based on the content of information discussed therein (e.g., IT), but not based on the specific reason for which potential user 20 needs the collaborative space (e.g., to obtain a quick answer). Under the present invention collaborative spaces 12 are analyzed based on interactivity metrics between current users 16 thereof. For example, assume that current users "A-C" are using collaborative space "X," the present invention will measure the interaction between such users so that the space can be adequately categorized for future users. That is, the nature of interactivity within the collaborative spaces 12 will be determined.

To this extent, under the present invention, metric analysis system 38 will first measure interactivity metrics between current users 16 of collaborative spaces 12. Such interactivity metrics include, among other things, the probability of response to posting(s); the average time to a first response to the posting(s); the percentage of first responses that occur within the first day of the posting(s); the average thread duration for posting(s); the average time between responses to the posting(s); the average number of total responses to the posting(s); the average depth of the thread tree for the posting(s); and participation analyses such as the percentage of users who only create new posting(s), the percentage of users who only respond to posting(s), and the percentage of users that both create posting(s) and respond to posting(s).

These metrics will give an accurate depiction of the type of interaction that occurs in the collaborative spaces 12. For example, an Internet newsgroup in which documents/messages are posted for an eventual reply will likely have a higher average time between responses that would an Internet chat room. Along these lines, Internet chat room "A" might have a longer average time between responses than does Internet chat room "B." Accordingly, if potential user 20 is seeking a collaborative space 12 in which responses to postings are made rapidly, potential user 20 would likely prefer Internet chat room "B." It should be noted that no single metric need be entirely probative of the best selection for potential user 20. For example, Internet chat room "B" might have a good average time for responses to postings, while at the same time having a very low probability that another user will post a response.

In any event, each of these metrics can be measured using any known mathematical/statistical techniques. For example, to measure the probability of response, a counter could be incremented each time a response to a posting is made (e.g., the "response count"). Then, the probability could be calculated by the following algorithm:

Probability of Response=[response count/total postings]*100

In another example, the average time between responses in a collaborative space could be measured by the summing the response time for all responses (e.g., the total response time) and the using following algorithm:

Average Response Time=[total response time/total number of responses]

In still yet another example, the percentage of users that only make postings but do not respond could be determined by the following algorithm:

Percentage Making Postings Only=[users only making postings/total users]

Under the present invention, the interactivity metrics can be optionally periodically measured to determine how the use of collaborative spaces 12 changes over time. This not only prevents information for becoming stale, but it also prevent a collaborative space from being defined based on "aberrational" usage. For example, while chat room "B" might have a fast response time today, that rate could drop dramatically over the next year. Moreover, the fast response time measured today could be uncharacteristic of what is typically exhibited within the chat room. Accordingly, periodically measuring the interactivity metrics will allow a more accurate depiction of collaborative spaces 12 to be determined.

In any event, once the interactivity metrics between current users 16 have been measured, they can be populated into a table. For example, referring to FIG. 2, an illustrative table 46 is shown depicting some of the interactivity metrics discussed above. It should be understood that table 46 only includes some of the interactivity metrics discussed above for brevity purposes. As such, it should be understood that a similar table created under the present invention can accommodate more or fewer interactivity metrics. As depicted, table 46 includes columns 48A-E for listing the measured data for the corresponding interactivity metrics, and rows 50A-C for listing the collaborative spaces for which the interactivity metrics were measured.

As can be seen in table 46, different collaborative spaces have greatly different interactivity between their users. For example, while collaborative space "A" had a probability of response of 83% and an average time between responses of 7 seconds, collaborative space "C" had a probability of response of 5% and an average time between responses of 4 days. Thus, if potential user 20 (FIG. 1) wished to locate a collaborative space to obtain a quick answer to a question, he/she would be better suited using collaborative space "A."

Accordingly, referring back to FIG. 1, once the table is populated, categorization system 40 will categorize collaborative spaces 12 based on the measured interactivity metrics (i.e., as indicated in the table). To this extent, collaborative spaces 12 can be categorized in any fashion that would make it easier to locate a suitable collaborative space for potential user 20. That is, collaborative spaces 12 could be categorized into groups that are based on the needs of potential users. For example, one group could comprise the collaborative spaces that have the fastest average rate of responses (e.g., for potential users that need quick answers to questions). Another group could be collaborative spaces that generate a large quantity of postings (e.g., for potential users that are doing research). As such, any quantity of groupings could be determined by categorization system 40.

Once collaborative spaces 12 are categorized, interface system 42 can provide an interface page(s) to potential user 20, which can then be used by potential user 20 to designate the type of collaborative space for which he/she is looking. Referring to FIG. 3, an illustrative interface page 60 is shown. As depicted, potential user 20 could be provided with a mechanism for providing desired interactivity metrics 62 for a collaborative space. These desired interactivity metrics 62 represents a profile for a collaborative space that best suits potential user 20's needs. It should be understood that although shown as sliding rule bars, any type of mechanism for providing the desired interactivity metrics could be provided. For example, potential user 20 could input values into blank fields.

In any event, based on desired interactivity metrics 62, recommendation system 44 (FIG. 1) will identify the collaborative spaces 12 within interface page 60 that best meet the desired interactivity metrics. Specifically, recommendation system 44 will recommend at least one of the categorized collaborative spaces to potential user 20. As depicted, a set of collaborative spaces 64 that met the desired interactivity metrics 62 have been recommended to potential user 20. Potential user 20 can select one of these collaborative spaces with the confidence that the space selected will likely suit his/her needs. It should be appreciated that the teachings of the present invention could be combined with a keyword-based search. For example, interface page 60 could allow potential user 20 to search for a collaborative space about JAVA where postings have a high probability of response.

It should also be understood that the present invention can be realized in hardware, software, or a combination of hardware and software. Any kind of computer system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

Referring now to FIG. 4, a method flow diagram 100 according to the present invention is shown. As depicted, first step S1 is to provide a plurality of collaborative spaces. Second step S2 is to analyze the plurality of collaborative spaces by measuring interactivity metrics between users of the plurality of collaborative spaces. Third step S3 is to categorize the plurality of collaborative spaces based on the interactivity metrics. Fourth step S4 is to receive desired interactivity metrics from a potential user of the plurality of collaborative spaces. Fifth step S5 is to recommend at least one of the categorized plurality of collaborative spaces to the potential user based on the desired interactivity metrics.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

We claim:

1. A computer-implemented method for analyzing collaborative spaces, comprising:

analyzing a plurality of collaborative spaces by measuring interactivity metrics between users of the plurality of collaborative spaces to determine the nature and type of interactivity within the collaborative space; wherein the plurality of collaborative spaces are selected from the group consisting of Internet chat rooms, instant message exchanges, electronic mail exchanges, exchange databases, document management systems, and client-server collaborative software and email system databases;

categorizing the plurality of collaborative spaces into one of a plurality of groups based on the nature and type of interactivity within the collaborative space, wherein the interactivity metrics include at least one of the following: a probability of response to postings by the users, an average time of response to the postings, an average thread duration corresponding to the postings, an average time between responses to the postings, and an average depth of a thread tree corresponding to the postings;

receiving desired interactivity metrics from a potential user of the plurality of collaborative spaces;

wherein at least one of the desired interactivity metrics provided by the potential user measures the nature and type of interactivity between users in each one of the plurality of collaborative spaces; and recommending at least one of the categorized plurality of collaborative spaces from a group of collaborative spaces to the potential user based on the desired interactivity metrics.

2. The method of claim 1, wherein the desired interactivity metrics are provided by the potential user via a user interface.

3. The method of claim 1, further comprising wherein the interactivity metrics are measured periodically to determine how interactivity between the users changes over time.

* * * * *